No. 646,085. Patented Mar. 27, 1900.
W. TRABUE.
FISHING REEL.
(Application filed July 22, 1899.)
(No Model.) 2 Sheets—Sheet 2.
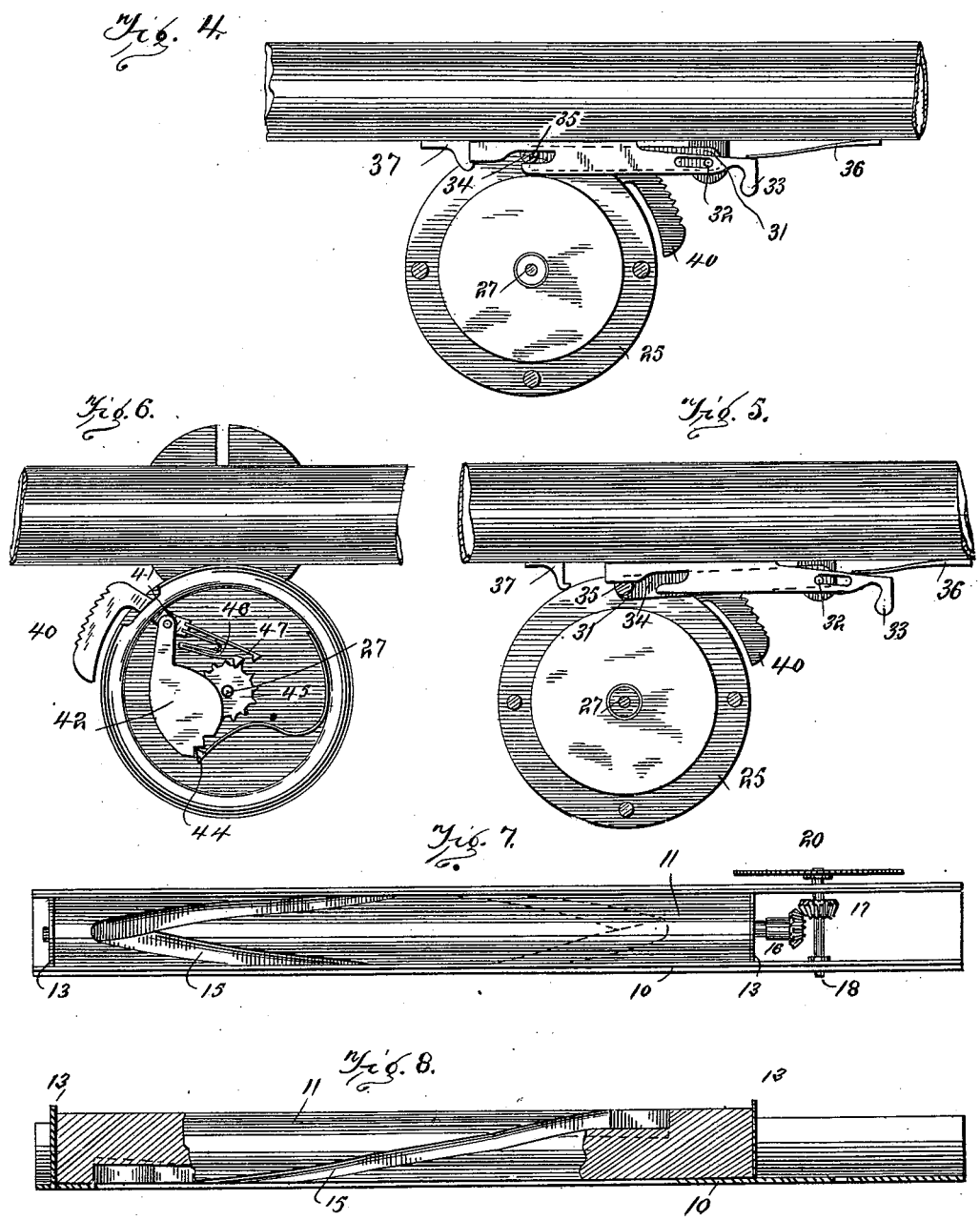

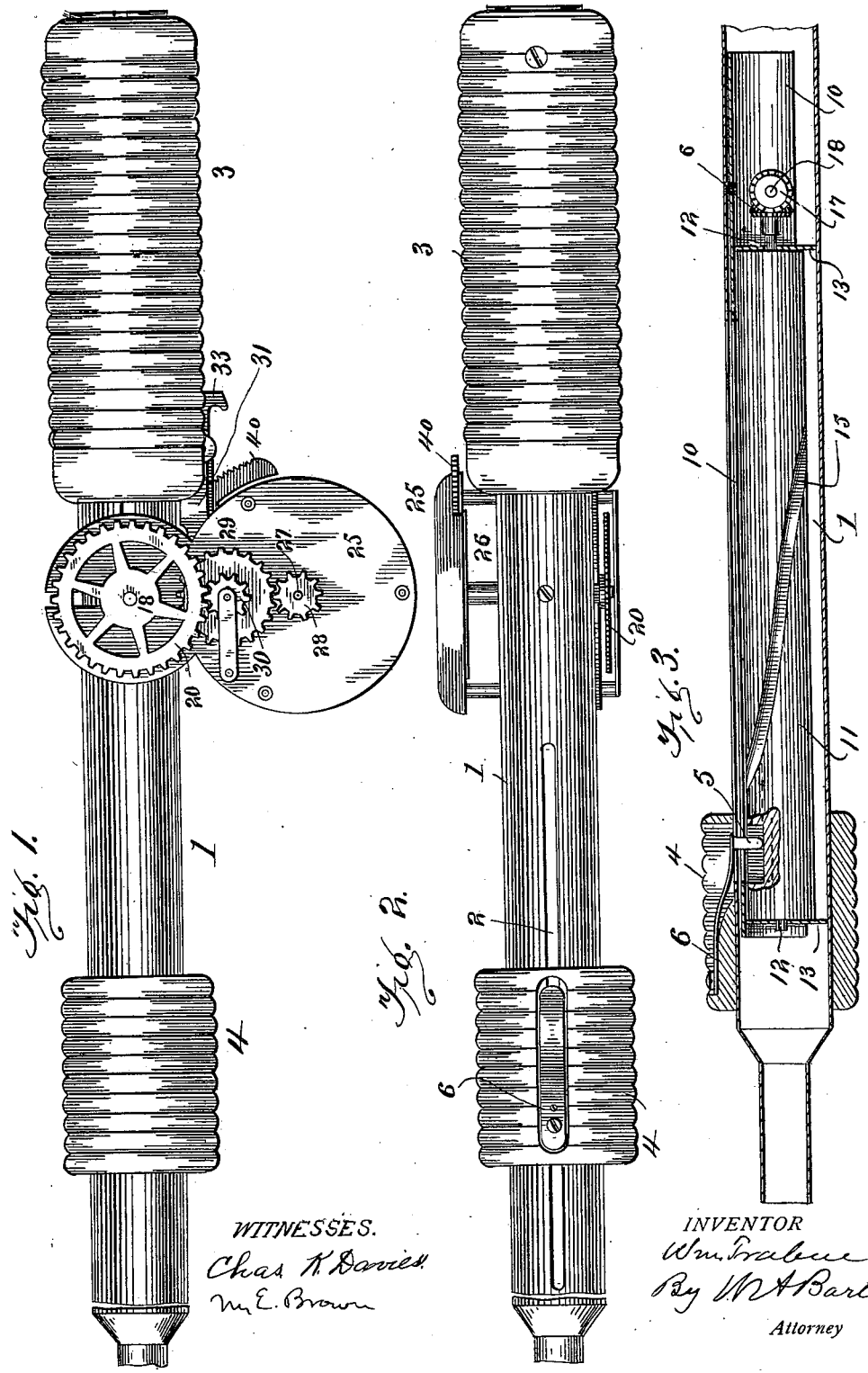

UNITED STATES PATENT OFFICE.

WILLIAM TRABUE, OF LOUISVILLE, KENTUCKY, ASSIGNOR OF THREE-FOURTHS TO ROBERT W. BINGHAM AND BEN HOWE, OF SAME PLACE.

FISHING-REEL.

SPECIFICATION forming part of Letters Patent No. 646,085, dated March 27, 1900.

Application filed July 22, 1899. Serial No. 724,827. (No model.)

*To all whom it may concern:*

Be it known that I, WILLIAM TRABUE, a citizen of the United States, residing at Louisville, in the county of Jefferson and State of Kentucky, have invented certain new and useful Improvements in Fishing-Reels, of which the following is a specification, reference being had therein to the accompanying drawings.

This invention relates to fishing-reels.

The objects of the invention are to produce a fishing-reel which may be wound by the longitudinal reciprocation of a handpiece on the handle; also, the connection with a reel of an uncoupling mechanism under control of thumb or finger, so that the reel may run free in casting; also, the connection of an alarm and drag with the reel, so that one or both may be controlled by the trip-lever; also, to improve the operating parts in various particulars.

Figure 1 is a side elevation of so much of a fishing rod and reel as is necessary to show the general features of the present invention. Fig. 2 is a plan of the mechanism of Fig. 1. Fig. 3 is a longitudinal section of a part of the butt-end of the rod, parts being broken away. Fig. 4 is an elevation and partial section showing mechanism by which the reel is ungeared to run free. Fig. 5 is a section and elevation of substantially the parts of Fig. 4 in different position. Fig. 6 is an end view of the drag-and-alarm mechanism. Fig. 7 is a section of so much of the inner tube of the rod and gear as will show the rotating spindle and some of its connections. Fig. 8 is a detail, partly in section, of spindle and tube.

The fishing-rod, as shown, is of any usual or approved material, but the handle or butt portion 1 is a metal tube, in which tube there is a slot 2. A hand piece or grasp 3, firmly attached to the tube, gives a good hold to the rod and a good finish. A movable handpiece or sleeve 4, preferably a little forward of the end of the stock, has a pin 5 projecting inward through the slot 2 in the tube. Said pin, as shown, is supported by a spring 6, resting in a recess in sleeve 4, so that the pin 5 may yield outwardly against the force of the spring. The tube 1 is preferably reinforced by a second short tube or segment 10, which is slotted like tube 1, the pin 5 passing through both slots. This internal tube or tube-segment 10 serves as a convenient support for the spindle 11, which is held by pintles 12 12 in transverse bearings or partitions 13. The spindle 11 has spiral grooves 15, which grooves extend, preferably, nearly the whole length of the spindle and are connected so that one spiral groove is the counterpart of the other. The spiral grooves 15 where they connect or fork at their intersection are not of uniform depth; but the grooves are made shallow near the junction and then deepened. (See Fig. 8.) The spring-pin 5, which enters the groove 15, may be reciprocated lengthwise of the rod by longitudinal reciprocation of sleeve 4. As the pin moves in straight slot 2 it will impel the spindle 11 in rotary direction by its extension into the spiral groove 15. As the pin rides in the shallower part of groove 15 the spring 6 yields and lets the pin yield outwardly. When the pin reaches the deeper groove at the junction, spring 6 presses the pin down into the deeper part of the groove. A reverse reciprocating movement of sleeve 4 causes the pin to return in the reverse groove, as the pin will follow the deep groove until gradually projected by the lessening depth of this groove rather than climb out of the deeper groove by returning in the slot in which it first traveled. The result is that the reciprocation of sleeve 4 on the rod rotates the spindle 11 continuously in one direction as long as sleeve 4 is reciprocated to the requisite distance.

Spindle 11 carries a bevel-gear 16, which gear engages a bevel-gear 17 on the transverse shaft 18, said shaft 18 extending transversely through the rod and having an external pinion 20, which pinion is in engagement with winding mechanism of the reel when the line is to be wound in by reciprocation of sleeve 4 lengthwise of the rod.

I am familiar with spiral drills, screw-drivers, &c., and with guns the breech-blocks of which are operated by a reciprocating sleeve on the barrel or magazine. My present invention in this relation is the adaptation of such mechanical elements to the purposes of a fishing-reel.

By means of the reciprocating sleeve or handpiece and the rotary spindle described I can produce a rapid rotation of pinion 20. The size of this pinion may be determined by the circumstances of the case, and multiplying-gear may be used to give any desirable speed to the reel, such trains of gear being within the knowledge of all competent mechanicians.

It is found in practice that the straight lengthwise reciprocation of an operating-piece on the rod gives greater facility of handling and greater power of movement than a crank or a pivoted-lever movement, both well known.

The reel-casing 25 is of suitable construction to contain a winding-spool 26 of any usual form, said reel or spool being driven by pinion 28 on shaft 27 of the spool, the intermediate gears 29 and 30 serving to transmit the power from the pinion 20 to the spool. Any other suitable train of gears might be substituted. The reel-casing has a lug or lugs 31 projecting at one side and extending lengthwise of tube 1, and this lug is pivoted at 32 between lugs on the rod, preferably partly covered by the handle-piece. The pin 32 is therefore the pintle of a hinge on which the reel-casing is held to the rod. A slide-piece 33, alongside of and carried by lug 31, has a slot through which the pivot-pin 32 passes. The slide-piece 33 has a cam-slot 34, which cam-slot is in position to engage lug or pin 35 on the reel-casing. A spring 36 is interposed between the fishing-rod and the slide 33, as shown. This spring by pressing out one end of the pivoted slide-piece from the rod presses in the other end, which by its engagement with pin 35 presses the reel-gear into gear with the driving-pinion 20 on the fishing-rod. By moving slide-piece 33 in the direction of its length the cam-slot 34, engaging pin 35, rocks the reel-casing on the hinge enough to disengage the gears, but prevents excess of movement. A hook 37 on the rod serves to limit the endwise movement of slide 33 and holds the parts against any play or rattling when the slide is so shifted as to hold the driving-gears in engagement.

To disengage the gears, so that the reel may run free, as in making a cast or for any other purpose, the slide 33 is drawn back by the finger or thumb, as in Fig. 5. The pin or lug 35 rides up the incline of slot 34, swinging the reel-casing on pivot 32 and disengaging the gears of the reel-casing from pinion 20, so that there is no connection with the winding mechanism and the reel may run free.

The winding-gears 28 29 30 may be housed in the reel-casing, if desirable.

An alarm and drag are connected to the reel at the opposite end from the winding-gears and preferably housed in a recess in the end of the casing. This mechanism is shown in Fig. 6.

A thumb-lever 40 projects at one side of the casing, being preferably roughened at its rear end to afford a secure handle or operating-piece. This lever is pivoted at 41 within the periphery of the reel-casing to the catch-plate 42. Catch-plate 42 extends over the end of the reel-shaft 27, said catch-plate having suitable notches, with one of which a spring-catch 44 may engage. The shaft 27 bears a ratchet-wheel or click 45. The lever 40 has a spring 46, which can be rocked into engagement with click 45 by pressing on lever 40, the plate 42 being at the same time shifted so that catch 44 enters one of the notches. This leaves the spring in engagement with the click, and any pull on the line which unwinds the reel causes the click to operate or sound and so give notice when a fish pulls on the line. To apply the drag, a second spring 47, which spring normally stands a little farther from ratchet 45 and is a little stiffer than spring 46, may be brought into contact with the click by pressing still further on lever 40, moving catch 44 into another notch of the catch-plate. Then both springs 46 and 47 will bear on click 45 and retard the movement of the reel.

The alarm and drag will be held in engagement with the click by the engagement of catch 44 with plate 42 until released by a reverse movement of lever 40. By pressing still harder on lever 40 in rocking direction the springs 46 and 47 may be made to bear still more strongly on the click, the catch 44 then resting against the edge of catch-plate 42, but not in the notches shown, or more notches might be made in the catch-plate; but it is generally desirable when the drag is applied "hard" that it be held in such position by the hand of the user and released when the stress is no longer needed.

From the above it will be seen that I provide for a rapid winding of the reel by the reciprocation of a sleeve or handpiece on the rod, and by suitable mechanism I provide that the reel may run free or may be operated with a drag. By the former arrangement I am able to secure much greater speed and facility in winding than can generally be attained by a crank or similar winding-handle.

I contemplate modifications within the scope of my claims.

What I claim is—

1. The combination with a fishing-rod and winding-reel, of a reciprocating handpiece on the rod, a spirally-grooved spindle having bearings in the rod, with the grooves of which a projection on the handpiece engages, to rotate said spindle, and a reel and connecting-gears by which said reel may be wound from said spindle, substantially as described.

2. In a fishing-reel mechanism, the combination of a hollow rod, a spirally-grooved spindle within the rod, a sleeve on the rod having a pin extending into the spiral groove in the rod, a reel, and gears connecting the spindle to said reel to operate the same, substantially as described.

3. In a fishing-reel mechanism, the slotted hollow rod, the spirally-grooved spindle within the rod having grooves of varying depth, the sleeve on the rod having a spring-pressed pin extending into the spindle-groove, and a reel and gears connecting to the said spindle, all combined.

4. In a fishing-reel mechanism, the slotted hollow rod, the spirally-grooved spindle journaled within the rod, the sleeve on the rod having a spring-pressed pin entering said groove in the spindle through the slot in the rod, the reel and gearing connecting it to the spindle, and means for disengaging said gears so the reel may run free, all combined substantially as described.

5. In a fishing-reel mechanism, the reel-casing pivotally connected to the rod, a gear and gear-operating mechanism on the rod and gears on the casing, and means for swinging the gears on the casing into or out of engagement with the gear on the rod, all combined substantially as described.

6. A fishing-rod, a reel-casing pivotally connected thereto, a slide on the rod having cam engagement with the reel-casing to swing the same on the pivot toward or from the rod, and gears on the rod and casing brought into or out of engagement by the operation of said slide, all combined.

7. In a fishing-reel, the casing and a winding-spool within the same, said spool having a ratchet-wheel or click, as common, a lever extending into the casing and having a thumb-piece outside, a spring directly connected to said lever and operating on said ratchet-wheel as a sounding-alarm when the lever is pressed a second spring extending within the casing and under control of the same lever, and operating on the ratchet-wheel when impelled by a sufficient movement of said lever, whereby an alarm and a variable drag may be simultaneously or successively brought into operation by various movements of the same lever, all substantially as described.

8. In a fishing-reel, the reel-shaft having a click, the thumb-lever carrying a spring-piece which may be moved into engagement with said click, a notched catch-plate connected to the thumb-lever, and a spring-catch engaging one of the notches in the catch-plate to control the spring-piece bearing on the click, all combined substantially as described.

In testimony whereof I affix my signature in presence of two witnesses.

WILLIAM TRABUE.

Witnesses:
W. A. BARTLETT,
M. E. BROWN.